United States Patent [19]
Hayes et al.

[11] 4,277,342
[45] Jul. 7, 1981

[54] COMBINED BIOLOGICAL-CHEMICAL DETOXIFICATION OF ORGANICS

[75] Inventors: Thomas D. Hayes, Trumansburg; William J. Jewell, Ithaca, both of N.Y.

[73] Assignee: Cornell Research Foundation, Inc., Ithaca, N.Y.

[21] Appl. No.: 80,558

[22] Filed: Oct. 1, 1979

[51] Int. Cl.³ .................. C02F 11/02; C02F 11/12
[52] U.S. Cl. .................. 210/609; 210/613; 210/614; 210/912
[58] Field of Search .................. 210/2, 3–7, 210/10, 12, 13, 11, 96.1, 15, 65–67; 426/53

[56] References Cited
U.S. PATENT DOCUMENTS

| | | | |
|---|---|---|---|
| 3,649,534 | 3/1972 | Schotte | 210/10 |
| 3,838,198 | 9/1974 | Bellamy et al. | 426/53 |
| 3,864,247 | 2/1975 | Fuchs | 210/12 |
| 3,892,660 | 7/1975 | Romell | 210/12 |
| 3,961,078 | 6/1976 | Stitt | 210/15 |
| 4,000,064 | 12/1976 | Romell et al. | 210/12 |
| 4,159,944 | 7/1979 | Erickson et al. | 210/10 |

FOREIGN PATENT DOCUMENTS 2327965  5/1977  France .................. 210/10

OTHER PUBLICATIONS

McNulty, K. J. et al., "Development of a New Process for Sludge Conditioning"; Nat. Conf. on Composting of Municipal Residue and Sludges; Aug. 23–25, 1977.

*Primary Examiner*—Benoit Castel
*Attorney, Agent, or Firm*—Laubscher & Laubscher

[57] ABSTRACT

A method is disclosed for the combined biological-chemical detoxification of municipal sewage sludge. A slurry of thickened primary sludge and secondary waste-activated sludge is fed to an enclosed insulated reactor vessel. The slurry is aerated with ambient air by a self-aspirating aerator to achieve autoheating of the slurry to thermophilic temperatures by the conservation of the metabolic heat of microbiological oxidation of the biodegradable organic material present in the slurry. The slurry is retained in the reactor for a period of time sufficient to destroy pathogenic bacteria and to increase the oxidation reduction potential of the biological reactor contents for the conversion of heavy metals to their desired oxidation state, following which the autoheated slurry is acidified to pH 1.0–3.0 for 6 to 12 hours to solubilize the heavy metals. Conventional dewatering techniques are used to separate the detoxified, acidic sludge and the acidic, heavy-metal-containing water. The sludge may be neutralized and reconditioned for safe land application and the metals can be recovered from the water using existing conventional techniques.

11 Claims, 7 Drawing Figures

Fig. 1

REACTOR WITH FLOATING
CENTRIRATOR IN PLACE

Fig. 2

REACTOR WITH MIDLAND FRINGS
UNIT IN PLACE

COMBINED BIOLOGICAL-CHEMICAL DETOXIFICATION OF ORGANICS

The Invention described herein was made in the course of work under a grant award No. R804636 from the Environmental Protection Agnecy.

BACKGROUND OF THE INVENTION

Sludge disposal for many cities in the United States has become a problem of increasing dimensions in the last two decades. With the highest per capita sludge generation in the world, the U.S. now generates about 4.5 billion dry kg per year in sewage solids which must be disposed of or utilized in a manner posing the least amount of threat to the environment. At present, most of this sludge is disposed of by means of landfill, ocean dumping and incineration; relatively small amounts are applied to agricultural lands. In light of emerging environmental, energy and economic constraints, land application now appears to be one of the most viable sludge utilization and disposal alternatives for the future. However, present sludge management technology often cannot guarantee public health protection or cost effective solutions.

Among the known methods of disinfecting sewage sludge, heat treatment is one of the most effective and environmentally safe. Raising the temperature to 60° C. or higher for several days greatly reduces the numbers of viable viruses and vegetative forms of bacteria and will assure the destruction of one of the most environmentally resistant organisms, ascaris eggs. The principal drawback of heat treatment is the necessary addition of external energy especially amid prospects of higher future energy prices and possible fuel shortages. It has been found, however, that thermophilic aerobic digestion has the capability of maintaining disinfection temperatures solely from the heat released from the biological oxidation of organic matter to carbon dioxide, thus requiring no supplemental heat addition. This concept was demonstrated by L. C. Matsch and R. F. Drnevich using a pure oxygen injection system, and is discussed in their article "Autothermal Aerobic Digestion", Journal Water Pollution Control Federation 49 (2), 296 (1977). While thermophilic aerobic digestion does not require the use of external energy, high operating costs result from the necessary addition of pure oxygen.

Studies in Europe have demonstrated autoheating by the use of self-aspirating aerators which increases the oxidation efficiency so that autoheating may be achieved without the addition of pure oxygen. These studies have not, however, applied the autoheating theory to municipal sewage sludges nor have they made use of insulated vessels to conserve the heat of oxidation whereby the digester may be maintained at thermophilic temperatures for extended periods of time.

While known sewage treatment facilities can produce pasteurized sewage sludge, the removal of heavy metals from municipal sewage sludge has seldom been emphasized as a necessary treatment step. The presence of heavy metals, particularly cadmium, at significant levels in sludges of municipal treatment plants receiving industrial discharges has become a topic of increasing concern in the light of the potential impact of heavy metals on the environment and the food chain. Within the decade, evidence has been accumulated indicating that cadmium in sludge-amended soils can be magnified and accumulated in the food chain. Of further concern, cadmium has been reported to accumulate in the human kidneys to life-time levels not far below concentrations that would be expected to produce damage to this organ. Other toxic heavy metals known to be present in municipal sewage sludge include chromium, copper, lead, nickel and zinc. It is well established that heavy metals can be removed from dilute wastewaters passing through a municipal treatment plant with a high degree of efficiency. In typical municipal treatment plants accepting effluent discharges from industry, heavy metals in the treated sewage can be either absorbed to organic particles and settled out in primary treatment or entrapped in the biological floc of the activated sludge process. Heavy metals can thus be removed from the sewage stream in primary and secondary treatment with combined efficiencies ranging from 60 to 90 percent in most cases. This results in a sludge with heavy metal concentrations 10 to 1000 times greater than concentrations measured in the influent sewage. The metals in the resultant sludge are usually predominant in their insoluble form as precipitates of hydroxide, carbonate, phosphate or sulfide, especially when heavy metal concentrations exceed $10^{-4}$ M and when pH values at or above neutrality are maintained. Sludges subject to prolonged thickening, storage, or anaerobic digestion, however, would have oxidation reduction potentials (ORP) in the range considered anaerobic, below $-300$ mv. Inorganic chemistry theory would predict that at low ORP and at near neutral pH, heavy metals such as cadmium, cooper, nickel, iron, lead and zinc exist at equilibrium primarily as insoluble sulfide precipitates.

The conversion of sludge heavy metals to the soluble form prior to physical separation would allow the removal of heavy metals with conventional dewatering techniques in use today (i.e., centrifugation, belt press, dewatering beds, vacuum filter, etc.).

For years, the extraction of heavy metals from sewage sludges and sludge/soil mixtures with acid washings has been used as a standard laboratory test to determine the extent of metal uptake likely to occur with plants grown on sludge-amended soils. Laboratory tests have been conducted on untreated and anaerobically treated sludge using acid extraction techniques to remove heavy metals. These studies have shown that the direct acidification of primary, waste-activated, or anaerobically digested sludge cannot consistently achieve a rapid and quantitative solubilization of heavy metals. While the data reported in the prior art seem to indicate that a processing scheme consisting of acid treatment combined with dewatering may be capable of some degree of removal of heavy metals from municipal sewage sludge, previous systems do not disclose the efficient, low-cost method of heavy metals solubilization by a combination of biological pretreatment and controlled-environment acidification.

SUMMARY OF THE INVENTION

The primary object of the present invention is the production of detoxified organic residue from even industrially contaminated sludges that could be safely recycled back to agriculture at reasonably low capital and energy costs.

A further object of the invention is the pasteurization of municipal sewage sludge without the addition of external heat or pure oxygen by autoheated aerobic thermophilic digestion combined with the efficient stripping of heavy metals present in the autoheated, pasteurized sludge material by controlled-environment acidification.

Another object of the invention is the solubilization of heavy metals in sewage sludge that has been pretreated in a system that produces a prolonged elevation of ORP (oxidation reduction potential).

A still further object of the invention is the utilization of autoheated aerobic thermophilic digestion coupled with controlled-environment acidification and conventional dewatering methods as an effective, low-cost treatment method for the removal of cadmium and other heavy metals from municipal sewage sludge.

Yet another object of the invention is a combined biological-chemical sludge treatment method that can be effectively and inexpensively integrated into conventional municipal sewage treatment systems.

BRIEF DESCRIPTION OF THE DRAWING

Other objects and advantages of the invention will become apparent from a study of the following specification when viewed in the light of the accompanying drawing, in which:

FIG. 7 is a graph depicting the effects of hydrochloric acid treatment at pH 2.0 on the capillary suction times (CST) of raw, thermophilic aerobic, and mesophilic anaerobic sludges.

DETAILED DESCRIPTION

A combination of thickened primary sludge and secondary waste-activated sludge (preferably containing about 50% biodegradable organic material) is supplied from conventional thickener pumps to a totally enclosed insulated reactor vessel. In a preferred embodiment, an insulated storage tank is provided as a holding tank for the sludges prior to their introduction to the reactor vessel. Pump means, such as a centrifugal pump, are provided to transfer the sludges from one vessel to another, and all vessels in the system are insulated. Insulation materials found to provide efficient conservation of heat in the system include polyurethane foam and polystyrene at thicknesses of from 3 cm. to 10 cm.

Figure 1:
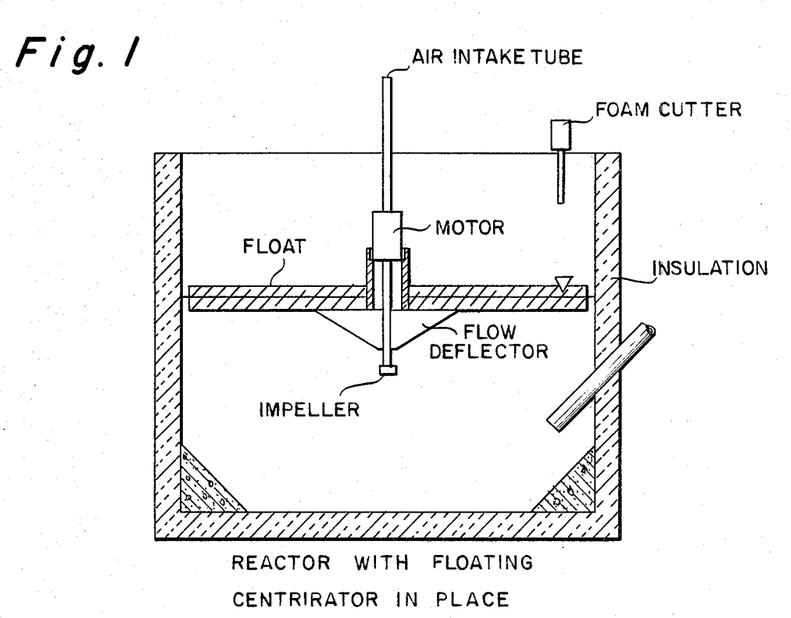
FIG. 1 illustrates diagrammatically the insulated reactor vessel of the present invention with the centrirator in place.
Figure 2:
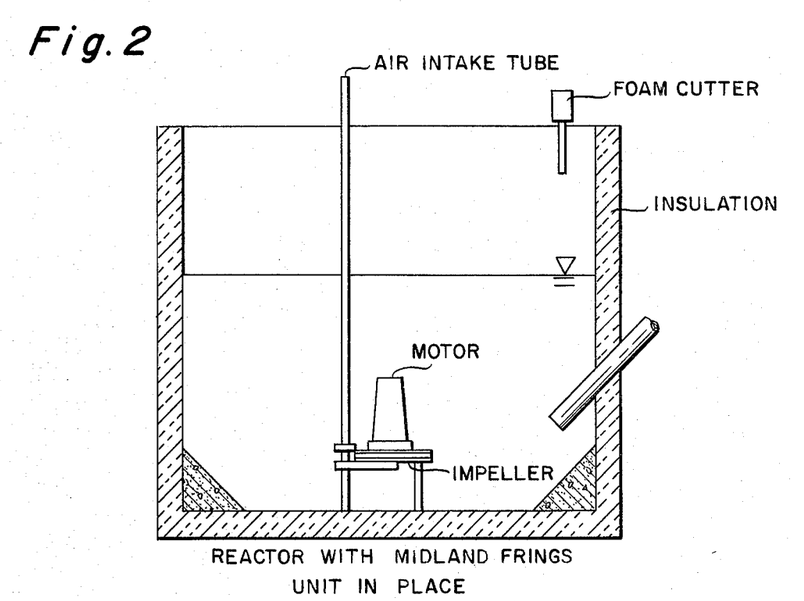
FIG. 2 illustrates diagrammatically the insulated reactor of the present invention with another type of aerator in place.

The reactor is filled to one-half its volume, the unfilled portion of the reactor providing a freeboard for foaming. Aeration with ambient air and mixing in the reactor are accomplished by self-aspirating aerators, such as the DeLaval Separator Company Centrirator which creates a vacuum at the center of the aerator impeller to draw air down the hollow intake tube and draw liquid up from the center of the tank, thereby providing aeration of the liquid at the impeller. Another effective self-aspirating aerator is the Midland-Frings manufactured by LFE Corporation. Self-aspirating aerators have an oxygen transfer efficiency in the treatment of sewage sludge of higher than 20%. Oxygen transferred to the sludge is then utilized by thermophilic aerobic microorganisms to oxidize biodegradable sludge organics resulting in a net release of metabolic heat sufficient to raise the temperature of the insulated reactor to the thermophilic temperature range of 43° C. to 70° C. This type of biological reaction is called aerobic autoheated thermophilic digestion (AATD). Thermophilic temperatures are maintained in the AATD system even when the temperature of the incoming sludge material is at 0° C. and the ambient air temperature is as low as −20° C. A foam cutter is provided in the upper, unfilled portion of the AATD reactor to control the level of foam created by aeration. The insulated reactor vessel and aerators are diagrammatically illustrated in FIGS. 1 and 2.

Hydraulic retention time (HRT) of the aerated sludge in the AATD reactor vessel may vary from 3–8 days, with a preferred HRT in a single reactor of five days for optimum pathogen destruction. In the preferred embodiment illustrated in FIG. 4, three or more reactor vessels may be employed with hydraulic retention periods as low as one day each. Heat exchangers attached to the effluent gas and liquids recover enough heat to enable the influent sludge to be partially pretreated. This preferred, multiple reactor system can be designed to operate at 65° C. with no external heat addition.

An insulated effluent tank may be provided to receive the autoheated, pathogen-free sludge from the reactor. The effluent tank may be identical to the influent tank, and may be set approximately 1½ m. lower than the reactor to facilitate gravity overflow from the reactor.

Figure 3:
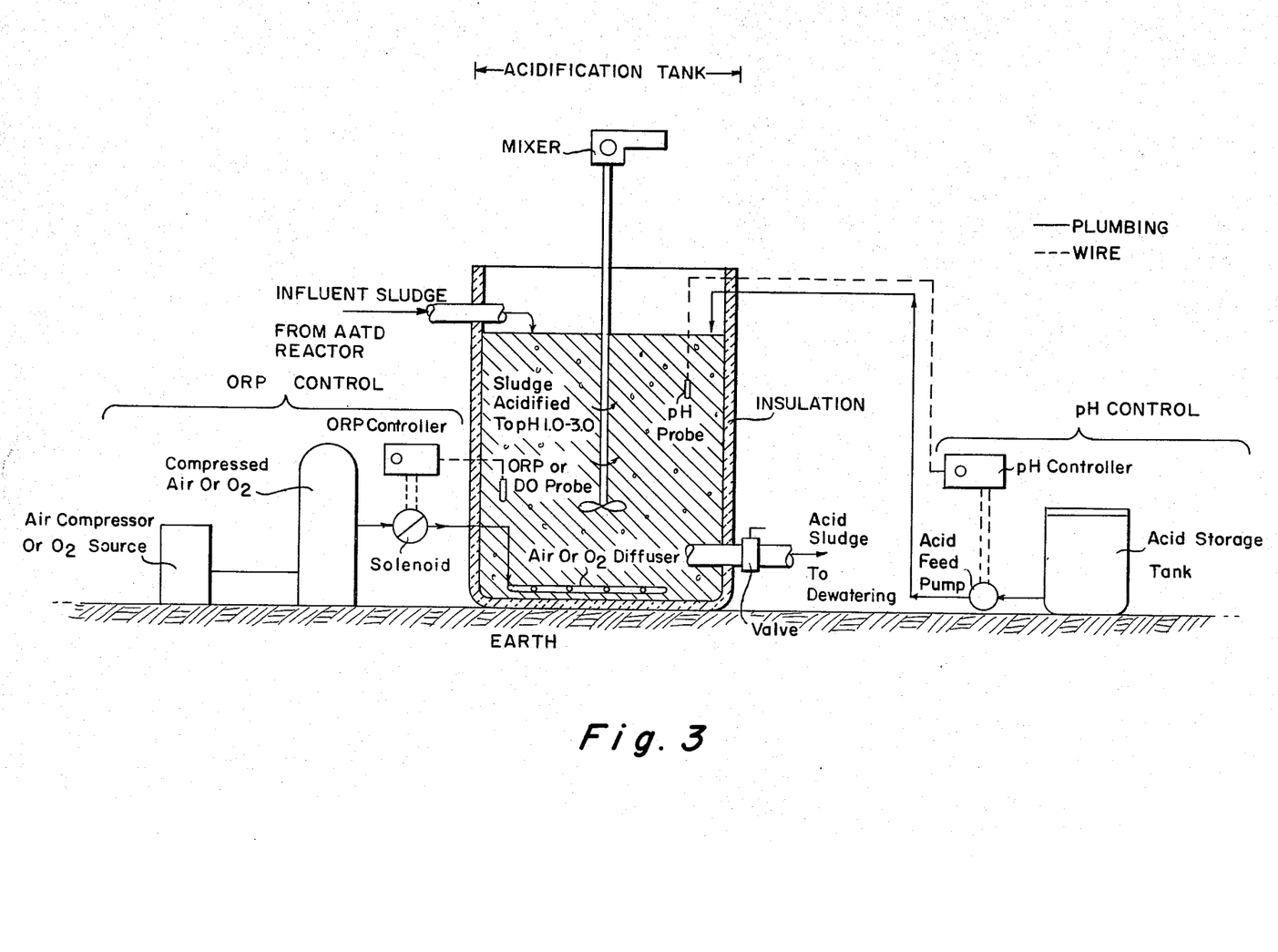
FIG. 3 illustrates diagrammatically the controlled environment acidification chamber.
Figure 4:
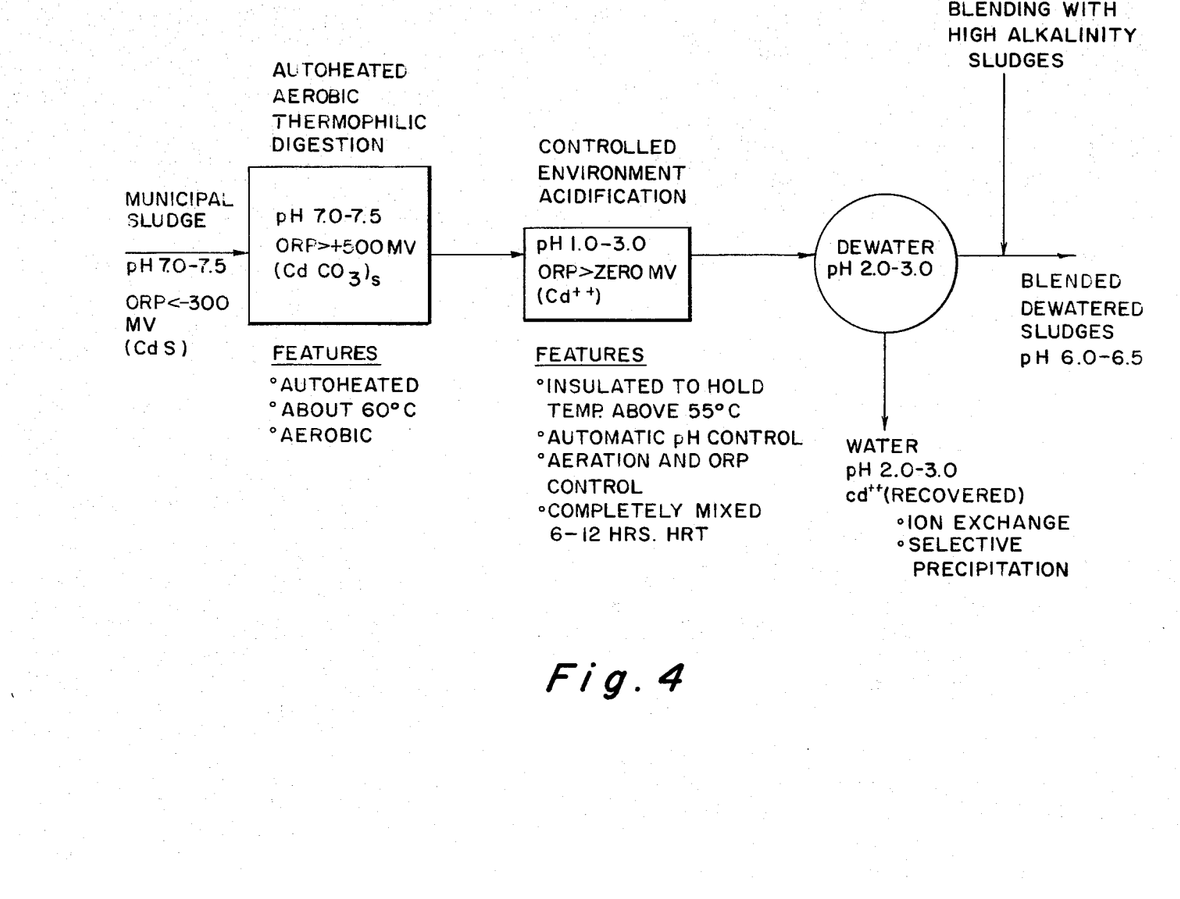
FIG. 4 is a conceptual flow chart of the present invention.
Figure 5:
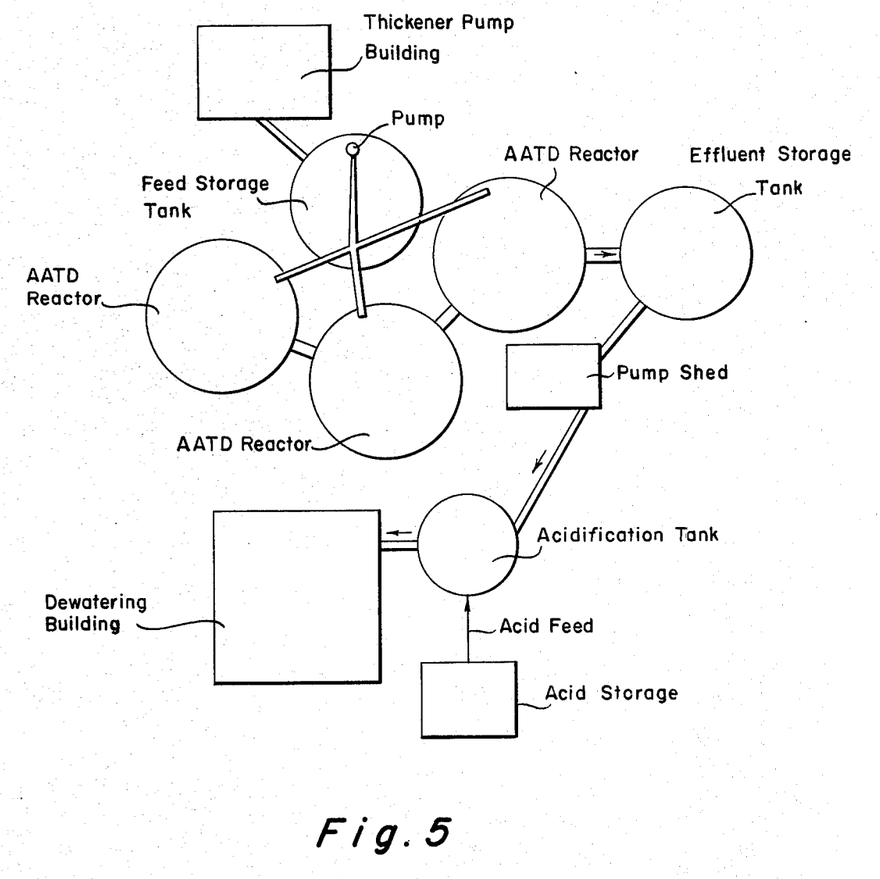
FIG. 5 is a schematic layout of the preferred embodiment of the present invention.

At the conclusion of the desired retention time, the autoheated sludge is acidified to a pH value of from 1.0 to 3.0 by the addition of an acid such as concentrated sulfuric or hydrochloric acid while continuing to agitate the sludge. The acidification may take place in the reactor vessel itself, in the insulated effluent tank, or in an insulated acidification tank (as shown in FIG. 3). The temperature of the sludge during the acidification process is maintained in the thermophilic range through the heat conserving properties of the well-insulated tanks. The addition of acid to the sludge could be regulated by a pH control system consisting of a pH probe, and a controller unit interfaced with an acid feeding system as shown in FIG. 3. The preferred pH value range of the acidified sludge is 1.5 to 2.5, this condition being maintained for a period of 6 to 12 hours. Other features of the acidification tank may include continuous or intermittent aeration regulated by an ORP control system, such as the Portatrol by Cole Parmer Company (Catalog No. 5655-00), in order to maintain the ORP at a level conducive for the acid solubilization of sludge metals. During the controlled-acidification period, the heavy metals are solubilized, having first been converted to forms conducive to solubilization by the preceding step of thermophilic aerobic digestion which produces a prolonged elevation of ORP. As shown in FIG. 4, during the digestion period the ORP of the sludge is elevated to greater than +50 mv, and is maintained at greater than zero mv during the controlled-acidification period. Enhanced solubilization of metals effected by this process combination is based upon the principle that if sludges can be elevated in temperature and in ORP for a prolonged period prior to acid treatment, a shift in heavy metal speciation will occur toward metal precipitate forms that are more rapidly solubilized upon acidification. This can be accomplished in a process that promotes sustained aeration. Inorganic chemistry theory would predict that if sewage sludges could be equilibrated at higher ORPs above zero mv, heavy metals and sulfur could be converted to their higher oxidation states resulting in a shift toward the formation of metal hydroxides, carbonates, and phosphates, thereby changing the nature and rate of heavy metal solubilization upon acidification. In addition, since the solubilization of most heavy metal precipitates may be characterized as endothermic, higher temperatures, as produced by the AATD system, will tend to shift solubilization equilibria in favor of the soluble species.

The following tables illustrate the results of four experiments on the solubilization of cadmium, nickel, zinc, chromium, copper and lead in raw, anaerobic and aerobic (AATD) sludges exposed to acid treatment for 12 hours. If the four experiments can be considered together as four acidification trial runs, the student-T statistical test can be employed to demonstrate significant differences in metals solubilization performance among the three sludges tested. At the 95% confidence level, the twelve-hour solubilization efficiencies for cadmium, copper and zinc were significantly higher in the acidification of autoheated aerobic thermophilic digester (AATD) sludge than those efficiencies observed with acidified raw or anaerobic sludges. Although solubilization efficiencies for chromium, nickel and lead may appear to be higher for the sludges pretreated with the AATD system, more data is needed to show a significant difference at the 95% confidence level.

The Solubilization of Cadmium, Nickel and Zinc in Raw, Anaerobic and Aerobic Sludges Exposed to Acid Treatment, pH 2.0, for Twelve Hours.

| | Solubilized Heavy Metals | | | | | |
|---|---|---|---|---|---|---|
| | Cadmium | | Nickel | | Zinc | |
| Sludge Type | mg/l | % of Total | mg/l | % of Total | mg/l | % of Total |
| Nitric Acid Treatment | | | | | | |
| Experiment 1 | | | | | | |
| Aerobic (AATD) | 4.8 | 107* | 7.5 | 106* | 98.6 | 106* |
| Anaerobic | 1.8 | 39 | 8.2 | 81.2 | 82.0 | 76 |
| Raw | 1.1 | 51 | 3.2 | 71.9 | 44.5 | 78 |
| Hydrochloric Acid Treatment | | | | | | |
| Experiment 2 | | | | | | |
| Aerobic (AATD) | 7.2 | 95.6 | 5.8 | 74.6 | 122 | 92.0 |
| Anaerobic | 4.2 | 73.5 | 5.2 | 65.5 | 74.0 | 71.2 |
| Raw | 3.2 | 39.3 | 5.3 | 66.4 | 83.0 | 63.8 |
| Experiment 3 | | | | | | |
| Aerobic (AATD) | 10.1 | 91.3 | 12.0 | 66.9 | 194 | 92.9 |
| Anaerobic | 4.4 | 58.6 | 10.4 | 70.3 | 110 | 71.9 |
| Raw | 2.4 | 34.9 | 8.0 | 58.4 | 119 | 73.9 |
| Experiment 4 | | | | | | |
| Aerobic (AATD) | 3.51 | 85.9 | 15.6 | 78.1 | 119 | 104.9 |
| Anaerobic | 0.55 | 11.7 | 9.5 | 41.1 | 54.1 | 39.6 |
| Raw | 0.03 | 0.6 | 9.6 | 42.4 | 26.4 | 19.5 |

*Quantitative solubilization achieved within 6 hours.

The Solubilization of Chromium, Copper and Lead in Raw, Anaerobic and Aerobic Sludges Exposed to Acid Treatment pH 2.0, for Twelve Hours.

| | Solubilized Heavy Metal | | | | | |
|---|---|---|---|---|---|---|
| | Chromium | | Copper | | Lead | |
| Sludge Type | mg/l | % of Total | mg/l | % of Total | mg/l | % of Total |
| Nitric Acid Treatment | | | | | | |
| Experiment 1 | | | | | | |
| Aerobic (AATD) | 10.6 | 38.8 | 16.2 | 66.9 | 8.3 | 62.6 |
| Anaerobic | 4.0 | 6.6 | 0.0 | 0.0 | 10.2 | 47.2 |
| Raw | 18.5 | 31.9 | 0.0 | 0.0 | 4.5 | 37.0 |
| Hydrochloric Acid Treatment | | | | | | |
| Experiment 2 | | | | | | |
| Aerobic (AATD) | 19.0 | 36.2 | 27.5 | 75.5 | 15.2 | 76.1 |
| Anaerobic | 21.5 | 41.7 | 0.0 | 0.0 | 12.4 | 66.2 |
| Raw | 15.0 | 33.2 | 0.0 | 0.0 | 6.8 | 34.7 |
| Experiment 3 | | | | | | |
| Aerobic (AATD) | 23.7 | 32.4 | 30.7 | 58.6 | 22.8 | 68.6 |
| Anaerobic | 17.4 | 27.4 | 0.11 | 0.3 | 12.8 | 47.1 |
| Raw | 13.8 | 28.7 | 0.0 | 0.0 | 9.4 | 29.8 |
| Experiment 4 | | | | | | |
| Aerobic (AATD) | 5.3 | 9.2 | 14.4 | 43.9 | 1.6 | 10.4 |
| Anaerobic | 3.3 | 4.9 | 0.0 | 0.0 | 1.4 | 10.1 |
| Raw | 6.8 | 9.8 | 0.0 | 0.0 | 0.0 | 0.0 |

Average values of heavy metal solubilization efficiencies measured for all four of the sludge acidification experiments conducted are tabulated in the table below. Again, the results show that with the exception of chromium, heavy metal extractabilities were consistently higher for acidified aerobic sludge than for the acid-treated raw or anaerobic sludges. Of greatest interest, an average cadmium solubilization efficiency of 95% was achieved from the acid-treatment of aerobic sludge in the laboratory. The order of metals solubilization efficiency from the acidification of aerobic sludge in this study was as follows:

$Zn \simeq Cd > Ni > Cu > Pb > Cr.$

Average Efficiencies of Heavy Metal Solubilization in Raw, Mesophilic Anaerobic and Thermophilic Aerobic Sludges Acidified to pH 2.0 for Twelve Hours.

| | HEAVY METALS, PERCENT SOLUBILIZED | | | | | |
|---|---|---|---|---|---|---|
| Sludge Type | Cd | Cr | Cu | Ni | Pb | Zn |
| Aerobic (55° C.) | 95 | 29 | 61 | 81 | 55 | 99 |
| Raw (25° C.) | 32 | 26 | 0 | 60 | 26 | 58 |
| Anaerobic (35° C.) | 46 | 20 | 0 | 64 | 42 | 65 |

In addition to solubilizing heavy metals, acidification also improves the dewatering characteristics of each sludge as shown in the graph of capillary suction time (CST) versus time of acid exposure, presented in FIG. 7. Within six hours, the CST values for the aerobic, raw and anaerobic sludges had respectively fallen from 630, 305 and 160 seconds to 125 seconds or below. Sludges of CST values approximating 100 seconds or less are generally regarded as suitable for dewatering.

Heavy metals extracted from the acidified sludge will eventually appear in the acidic water released during dewatering. Following conventional dewatering to concentrate sludge solids from 3–5% TS to 20–22% TS, more than 80% of the metals-bearing liquid fraction will be separated out from the sludge. This acidic stream may then be subjected to treatment by ion exchange, electrodeposition or neutralization for the recovery of heavy metals to be marketed back to industry. A flow chart of the combined biological-chemical treatment followed by conventional dewatering and heavy metal recovery is depicted in FIG. 4.

Figure 6:
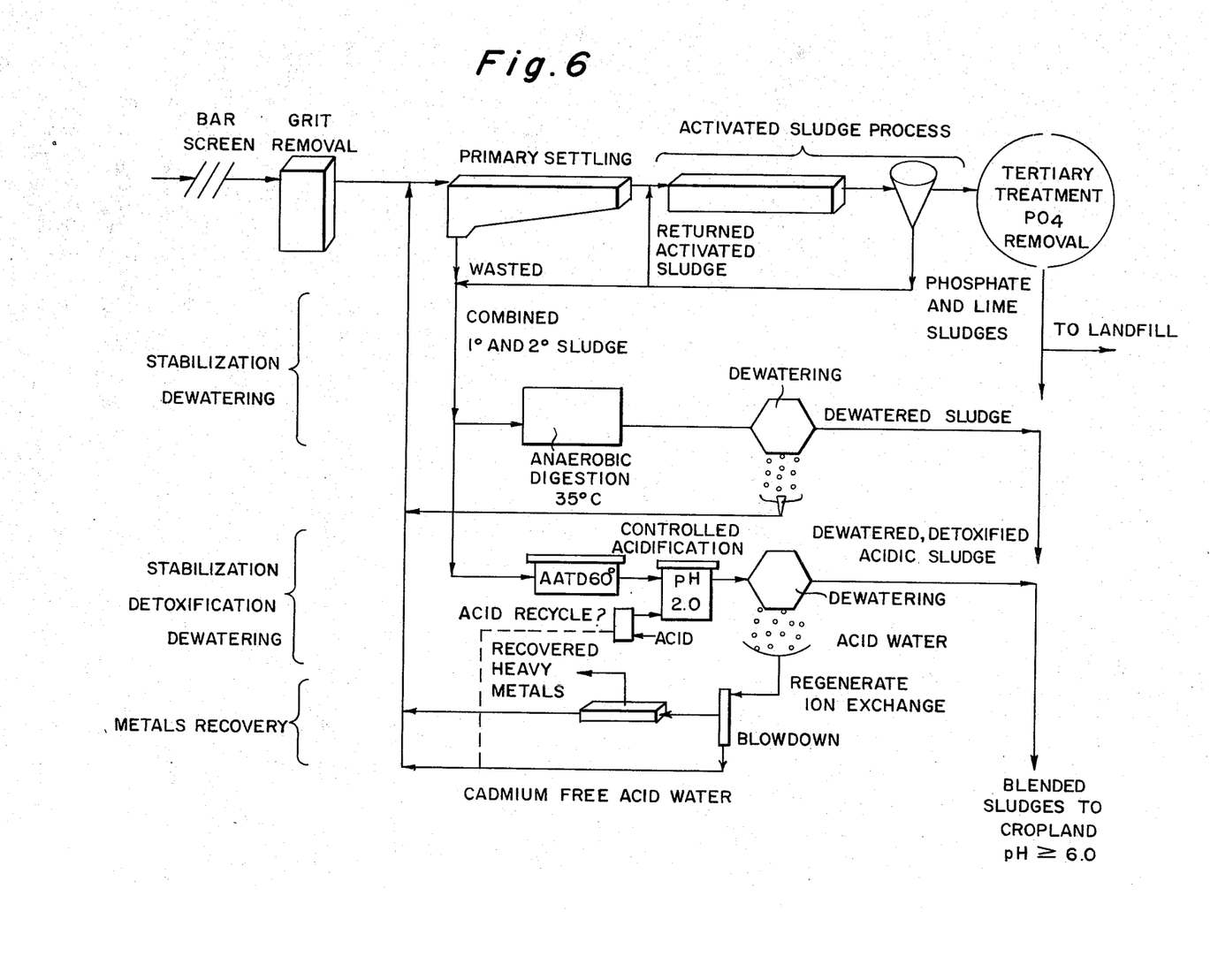
FIG. 6 is a flow chart illustrating one method of integrating the sewage sludge treatment process of the present invention into a conventional municipal sewage treatment system.

Finally, the AATD and controlled-environment acidification process of the instant invention may be beneficially integrated into conventional wastewater treatment schemes in a number of ways. One possible combination of sludge treatment systems is shown in FIG. 6. Placed in parallel with existing sludge treatment processes, the degree of metals removal achieved may be regulated by the portion of the sludge stream chosen for metals extraction as depicted in FIG. 6. Sludge in this flow scheme may be treated either partially or entirely through the strategic division of sludge flows through or around the heavy metals removal stages. Ultimately, the various sludge fractions of the treatment scheme may be dewatered and recombined for subsequent land application. If a considerable portion of the sludge was bypassed around the heavy metals removal process and later combined with sludge fraction which was acidified, the pH and alkalinity of the resultant mixture could very well be acceptable for direct land application without substantial additions of lime. If additional pH adjustment would be needed, the phosphorus-lime sludges from the tertiary treatment stage could be added to amend acidic sludges.

CONCLUSION

The instant invention presents a new concept of municipal sludge management in the light of local, state and federal standards pertaining to safe pathogen and cadmium loadings to farm land. Pathogens and toxic metals are removed from sewage sludge at the sewage treatment facility by using an autoheated biological waste treatment process combined with short-term controlled-environment acidification followed by conventional dewatering.

Implementation of the AATD and acidification processes for the centralized recovery of sludge heavy metals at the sewage treatment plant has obvious advantages over any efforts to enforce more stringent controls on heavy metal dishcarges on an industry-by-industry basis. First of all, any small concentration of heavy metal occuring in the influent sewage stream is highly likely to show up in the treatment plant sludges at levels 10 to 1000 times greater. Although pretreatment requirements for industry could prevent the very high levels of sludge heavy metals that are toxic to biological systems, it would be very difficult if not logistically impossible to control all industrial discharges to sewers to the point that sludge cadmium levels, say, would be acceptable for land application on a nitrogen-requirement loading basis. If, for example, the desired level for cadmium in sludges (applied to cropland on a nitrogen basis) was set at 20 mg/dry kg, the permissible wet cadmium level in a 4% TS sludge would be around 2.4 ppm which could be predisposed by a sewage influent cadmium titer of only 0.024 ppm, assuming a 100× scrubbing and multiplication effect. For a city of over 100,000, less than 2.0 lbs. of total cadmium discharged to sewers (by neglect or intent) during a 24 hour period could cause a 20 mg/dry kg limit for sludge cadmium to be exceeded. To prevent a few pounds of any commonly used metal from entering the sewers of each industrial city of the U.S. (with reasonable consistency and success) would, no doubt, be an insurmountable regulatory task. On the other hand, the detoxification of sewage sludges at a central location could allow confident monitoring and regulation of levels of sludge cadmium and other hazardous agents. Secondly, the social cost of requiring each individual industry to control cadmium to the sub-part-per-million or part-per-billion level would likely be far higher than the relative cost of centralized detoxification of sewage sludges. Thirdly, metals recovery from acid extraction streams could be conducted at a larger and, perhaps, a more economical scale with a centralized, municipal metals-recovery operation. The municipality operating a 10 MGD sewage treatment and sludge metals recovery facility, for example, could conceivably reclaim nearly half a pound of cadmium for every part per million of cadmium removed from wet sludge. In addition to use of the process by municipal sewage treatment facilities, the detoxification process may also be utilized by industry to remove heavy metals from concentrated organic sludges.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. A combined biological-chemical method for detoxifying a slurry of sludge of the municipal sewage or industrial organic type, which sludge contains excess-waste thermophilic bacteria, biodegradable organic material, sulfur, and toxic heavy metals in insoluble form, which comprises the sequential steps of:
   (a) introducing a sufficient quantity of the sludge slurry into an enclosed insulated reactor vessel to fill the same to about one-half of its volume;
   (b) aerating the slurry with ambient air by means of a self-aspirating aerator, and simultaneously cutting foam produced thereby, thereby to effect autoheating of the slurry by the thermophilic bacteria to a temperature maintained in the thermophilic range of from about 43° C. to about 70° C., said autoheating being achieved by conservation of the metabolic heat of oxidation of the biodegradable organic material in said insulated reactor vessel;
   (c) retaining said autoheated slurry in said reactor for a hydraulic retention time of 3 to 8 days sufficient to destroy the pathogenic bacteria and increase the oxidation reduction potential to a level greater than $+500$ mv, whereby the sulfur and heavy metals are converted to a desired higher oxidation state;
   (d) adding to said autoheated slurry a quantity of concentrated acid in an amount sufficient to acidify said slurry to a pH value ranging from 1.0 to 3.0 for an acidification period of 6 to 12 hours sufficient to solubilize the heavy metals while maintaining said oxidation reduction potential at a level greater than zero mv, and the temperature in the thermophilic range; and
   (e) dewatering the acidified slurry to remove the solubilized heavy metals therefrom, thereby to produce dewatered, detoxified acidic sludge and acidic, heavy-metal-containing water.

2. The method as recited in claim 1, wherein said autoheated slurry is retained in said reactor for a period of 3 to 5 days.

3. The method as recited in claim 2, wherein the preferred retention time of said autoheated slurry in said reactor vessel is five days.

4. The method as recited in claim 1, and further including the step of transferring said autoheated slurry from said reactor into an insulated effluent tank, and acidifying said slurry in said effluent tank.

5. The method a recited in claim 1, and further including the step of transferring said slurry in succession through a series of reactor vessels.

6. The method as recited in claim 5, wherein said series of reactor vessels consists of three said reactors, and further wherein said slurry is retained in each said reactor for at least one day, and further including the step of recovering heat from said autoheated slurry, whereby each said reactor will be maintained at a temperature of approximately 65° C.

7. The method as recited in claim 1, wherein said concentrated acid is selected from the group consisting of sulfuric acid and hydrochloric acid, and further wherein the preferred pH value range of said acidified autoheated slurry is from 1.5 to 2.5.

8. The method as recited in claim 1, and further including the step of aerating said autoheated slurry under controlled conditions during said acidification period to maintain said oxidation reduction potential at a level conducive for the acid solubilization of heavy metals.

9. The method as recited in claim 1, and further including the additional step of recovering said heavy metals from said acidic, heavy-metal-containing water.

10. The method as recited in claim 1, and further including the step of incorporating said method in parallel with existing sludge treatment systems wherein a portion of the sludge stream flowing through said existing system is directed into said reactor vessel and thereon through said detoxification system.

11. The method as recited in claim 10, and further including the step of combining said dewatered, detoxified acidic sludge with non-acidic sludge from said existing treatment system, the pH and alkalinity of the resulting mixture being acceptable for direct land application.

* * * * *